United States Patent
Köhler et al.

(10) Patent No.: US 12,287,652 B2
(45) Date of Patent: Apr. 29, 2025

(54) FLUID-CONVEYING DEVICE WITH VALVES FOR CONTROLLING THE FLUID FLOW

(71) Applicant: Vitesco Technologies GmbH, Regensburg (DE)

(72) Inventors: Cornelius Köhler, Schwalbach a. T.s. (DE); Peter Bauer, Schwalbach a. T.s. (DE); Jan Hodgson, Schwalbach a. T.s. (DE); Tobias Luebbert, Schwalbach a. T.s. (DE)

(73) Assignee: Vitesco Technologies GmbH, Regensburg (DE)

( * ) Notice: Subject to any disclaimer, the term of this patent is extended or adjusted under 35 U.S.C. 154(b) by 27 days.

(21) Appl. No.: 17/962,003

(22) Filed: Oct. 7, 2022

(65) Prior Publication Data

US 2023/0111848 A1 Apr. 13, 2023

(30) Foreign Application Priority Data

Oct. 8, 2021 (DE) ...................... 10 2021 211 402.4

(51) Int. Cl.
*G05D 7/01* (2006.01)
(52) U.S. Cl.
CPC ...................... *G05D 7/01* (2013.01)
(58) Field of Classification Search
CPC ....... G05D 7/01; Y02T 10/12; F04B 53/1092; F02M 25/025
USPC .................................................. 137/512, 883
See application file for complete search history.

(56) References Cited

U.S. PATENT DOCUMENTS 8,074,679 B2 * 12/2011 Jensen ................ F04B 53/1032
417/454

FOREIGN PATENT DOCUMENTS

| DE | 4225444 | 2/1993 |
|---|---|---|
| DE | 102010029600 | 12/2011 |
| DE | 102010036109 | 3/2012 |
| DE | 102012215024 | 2/2014 |
| DE | 102014001126 | 7/2015 |
| DE | 102016205555 | 10/2017 |
| DE | 102016111194 | 12/2017 |
| WO | WO 2014080266 | 5/2014 |

OTHER PUBLICATIONS

DE 102014001126 A1—Machine Translation (Year: 2014).*
Office Action of corresponding German Patent Application No. DE 10 2021 211 402.4.

* cited by examiner

*Primary Examiner* — Daphne M Barry
(74) *Attorney, Agent, or Firm* — COZEN O'CONNOR

(57) ABSTRACT

A fluid-conveying device for conveying a fluid, such as in particular water, from a tank. The fluid can be conveyed along a dosing line to an injection point by a pump, wherein the dosing line is attached at a pressure side of the pump by a connection plug which is attached to an outlet line. The fluid-conveying device has at least one first valve, which is preloaded by a spring and which is configured to prevent a fluid flow from the dosing line to the outlet line and which is furthermore configured to permit the fluid flow from the outlet line to the dosing line if a predefined minimum pressure p1 is reached on that side of the first valve which faces toward the outlet opening.

7 Claims, 4 Drawing Sheets

FLUID-CONVEYING DEVICE WITH VALVES FOR CONTROLLING THE FLUID FLOW

BACKGROUND OF INVENTION

1. Field of the Invention

The disclosure relates to a fluid-conveying device for conveying a fluid, such as in particular water, from a tank, wherein the fluid can be conveyed along a dosing line to an injection point by a pump, wherein the dosing line is attached at the pressure side of the pump by a connection plug which is attached to an outlet line.

2. Description of Related Art

Due to increasing demands on reduced carbon dioxide emissions, internal combustion engines are increasingly being optimized with regard to their fuel consumption. However, known internal combustion engines cannot be optimally operated in terms of consumption at operating points with high load, since the operation is limited by knocking tendency and high exhaust-gas temperatures. A possible measure for reducing the knocking tendency and for lowering the exhaust-gas temperatures is the injection of water. Separate water-injection systems are commonly provided here to allow the water injection. In this regard, WO 2014/080266 A1, for example, has disclosed a water-injection system for an internal combustion engine with exhaust-gas recirculation, in which system the water is injected into the mass flow of the exhaust-gas recirculation.

Basically, water-conveying modules have at least one tank for storing the water and, furthermore, suitable conveying elements, such as a pump, to conduct the water along suitable lines to the combustion chamber or to a point upstream of the combustion chamber.

Since water has a freezing point which, under the usual operating conditions of a motor vehicle, is generally reached, freezing of the water stored in the tank or of the water situated in the lines or in the conveying module can generally be expected, and for this reason it is necessary for precautionary measures that prevent damage to the water-conveying module as a whole to be adopted.

At the connection of the conveying line to the conveying module, provision is generally made of electrically controllable valves, which influence the flow direction of the water in the conveying line. In this case, the known valves are constructed such that a valve, which is electrically energized, holds the conveying line open, a valve which is not electrically energized closes off the conveying line and, from a certain positive pressure, opens in the direction away from the conveying module, while the flow direction from the conveying line into the conveying module is closed off.

A particular disadvantage of the devices in the prior art is that a high outlay for development is necessary to use suitable solutions with electrically controllable valves. Furthermore, such a solution is associated with high costs, and there is a relatively great installation space requirement since, on the one hand, the electrically controlled valve needs a relatively great amount of space and, on the other hand, it is necessary to provide a controller together with signal line.

SUMMARY OF THE INVENTION

It is therefore the object of one aspect the present invention to provide a fluid-conveying device which protects the components arranged upstream of the dosing line, such as in particular the filter and the pump, against high pressures from the dosing line.

An exemplary aspect of the invention relates to a fluid-conveying device for conveying a fluid, such as in particular water, from a tank, wherein the fluid can be conveyed along a dosing line to an injection point by a pump, wherein the dosing line is attached at the pressure side of the pump by a connection plug which is attached to an outlet line, wherein the fluid-conveying device has at least one first valve which is preloaded by a spring and is configured to prevent a fluid flow from the dosing line to the outlet line and which is furthermore configured to permit the fluid flow from the outlet line to the dosing line if a predefined minimum pressure p1 is reached on that side of the first valve which faces toward the outlet opening.

A valve preloaded by a spring permits fluid flow in one direction if a pressure on the valve that is greater than the force acting on the valve by way of the spring is exerted. The spring holds the valve in a closed state without external pressure. If the minimum pressure is reached, the valve opens and opens up the fluid-flow path. If the minimum pressure is fallen below, the valve closes and the fluid flow is interrupted. In the opposite flow direction, the valve is closed at all times, so that it acts a kind of check valve, which permits fluid flow in one direction from a certain working pressure and prevents fluid flow in the opposite direction.

In the case according to one aspect of the invention, the valve allows fluid to flow out of the outlet line and into the dosing line from a certain minimum conveying pressure that is built up by the pump. A backflow from the dosing line into the outlet line is completely prevented by the valve, however. This is advantageous in particular because, in this way, no damage to the conveying device owing to ice formation in the dosing line and thus due to a backflow of the fluid can occur. In particular freezing fluid expands, and damage to the fluid lines and the conveying device can consequently occur. By preventing introduction of fluid back into the fluid-conveying device from the dosing line, it is possible to minimize the negative effects.

Owing to the exposed location of the dosing line, ice formation at low temperatures begins preferably within the dosing line.

It is particularly advantageous if the first valve is arranged within the outlet line. This is advantageous in order to prevent reversed fluid flow as close as possible to the fluid-conveying device and thus to the sensitive components, such as in particular the pump. This prevents a situation in which, due to a freezing dosing line, an additional pressure acts on the fluid-conveying device as a result of the ice formation. The positioning of the valve close to the pump, for example directly in the outlet line, makes it possible to minimize the fluid section between the pump and the valve and thus also the quantity of fluid which can remain on the pressure side of the pump.

It is also advantageous if the outlet line has on its end region a connection plug configured for attaching the dosing line, wherein the at least one first valve is integrated in the connection plug. The provision of the valve in the connection plug is advantageous in particular in order to make possible as simple an assembly as possible and preferably to be able to use the connection plug provided with the valve in as modular a manner as possible.

A preferred exemplary aspect is characterized in that, in addition to a first valve, the fluid-conveying device has a second valve, wherein the second valve is configured to allow a fluid flow from the dosing line in a direction toward the outlet line if a second pressure p2 acts on the second valve from the side of the dosing line.

The second valve allows, under certain pressure requirements, a fluid flow in a direction opposite the throughflow direction of the first valve. The second valve thus makes it possible for the fluid which has remained in the dosing line to flow back in the direction toward the outlet line. This is relevant in particular if the fluid that has remained in the dosing line begins to freeze. Due to the associated expansion, a pressure is exerted on the still liquid part of the fluid in the dosing line, which then also acts on the second valve. With exceedance of a defined pressure level, the second valve opens and permits flowing-back of the fluid until the defined pressure level in the dosing line is fallen below again. In this way, damage to the dosing line can be avoided since the fluid remaining in the dosing line is reduced significantly and thus the expansion and the forces consequently acting on the dosing line are reduced.

It is also preferable if the pressure p1, at which the first valve opens, is lower than the pressure p2, at which the second valve opens. The pressure p1 is determined substantially by the conveying pressure of the pump of the conveying device, whereas the pressure p2 is determined substantially by the forces in the dosing line than occur in the case of freezing. The pressure level p1 can thus be significantly below the pressure level p2 in particular in a situation in which the dosing line freezes.

Furthermore, it is advantageous if the dosing line is in fluid communication with a discharge line by way of the second valve and/or is in fluid communication with the tank by way of a bypass.

The intention is for the fluid flowing from the dosing line back through the second valve not to flow back into the fluid-conveying device counter to the conveying direction of the pump, but rather to be discharged into the environment via a discharge line, or to be conveyed back into the fluid tank via a suitable bypass. In the case of water as fluid to be conveyed, it may be discharged into the environment without hesitation. In the case of more aggressive media, discharge into the environment should be avoided and instead conveyance back into the tank of the fluid-conveying device should be preferred.

It is furthermore advantageous if the first valve and the second valve are arranged in the connection plug. The arrangement of the valves in the connection plug is advantageous in order to produce as compact a structural unit as possible and to be able to use the plug in a modular manner in as many applications as possible.

It is also expedient if the first valve and the second valve are arranged parallel to one another in a common line, wherein the line is subdivided by the valves into two line sections with opposite flow directions.

Such an arrangement is particularly advantageous since a highly compact design can be achieved. The flow cross section in which the valves are arranged is subdivided into two flow channels by the two valves. The first valve allows in this case the flowing of the fluid from the pump to the dosing line, while the second valve allows the flowing of the fluid in the opposite flow direction.

Furthermore, it is advantageous if a bypass branches off on a side of the first valve that faces away from the outlet line, wherein the bypass leads into the surroundings and/or back into the tank storing the fluid. The bypass is formed by a branch on the dosing line. The arrangement on that side of the first valve which faces away from the outlet line ensures that the fluid flowing back from the dosing line, for example as a result of ice formation, can flow away from the dosing line. In this case, the second valve opens up the flow path into the bypass if the pressure in the dosing line in the direction of the second valve is sufficiently high.

The bypass constitutes a fluidic connection to the storage tank of the fluid or a fluidic connection to the surroundings of the fluid-conveying device.

It is furthermore expedient if the connection between the dosing line and the outlet line is in the form of a connection plug, wherein the connection plug has coupling elements which are designed in accordance with SAE and/or VDA standards. This is particularly advantageous in order to ensure a secure connection of the connection plug to the dosing line that is sufficiently stable to accommodate the mechanical loads in particular within the context of a use in a motor vehicle. Furthermore, the connection surfaces of such a connection plug are standardized, so that a high degree of compatibility is ensured.

The connection plug can in this case accommodate one of the two valves or both valves particularly preferably in its flow channel formed in the interior. The connection plug can also accommodate the branch of the bypass.

Advantageous refinements of the present invention are described in the dependent claims and in the following description of the figures.

BRIEF DESCRIPTION OF THE DRAWINGS

The invention will be discussed in detail below on the basis of exemplary embodiments with reference to the drawings. In the drawings.

DETAILED DESCRIPTION OF THE PRESENTLY PREFERRED EMBODIMENTS

Figure 1:
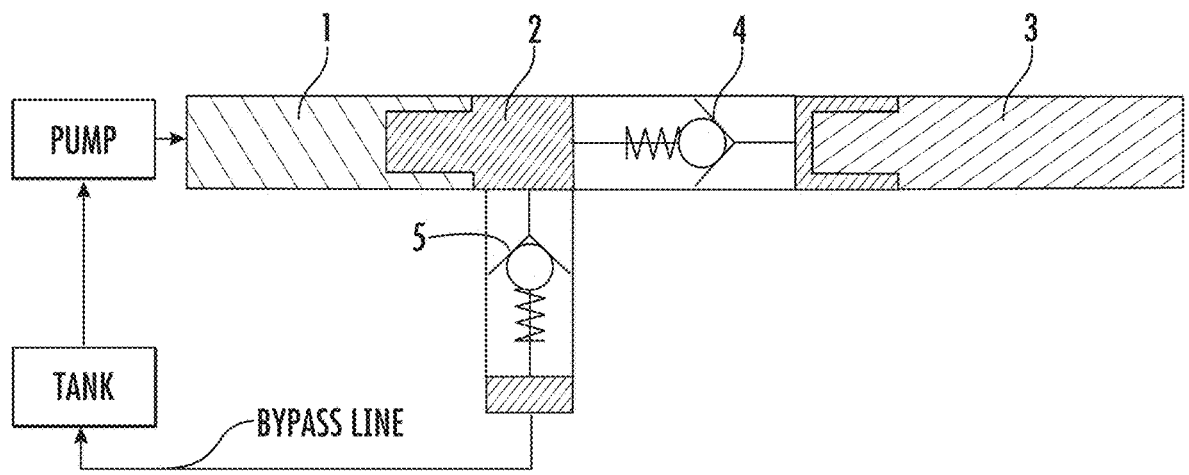
FIG. 1 is a sectional view through a schematic illustration of a dosing line and an outlet line, with two valves being shown, wherein one valve influences the fluid flow into the dosing line and the other valve influences the backflow into a bypass.

FIG. 1 shows a schematic view of a dosing line 1 which is fluidically connected to an outlet line 3 of the fluid-conveying device by way of a connection plug 2. By a pump, a fluid, preferably water, can be conveyed from a tank to a dosing line 1 via the outlet line 3, which is arranged on the pressure side of the pump. The dosing line 1 and the outlet line 3 are fluidically connected to one another preferably via a connection plug 2.

FIG. 1 shows two valves 4, 5, wherein the first valve 4 is arranged in the connection plug 2 and, from a certain pressure level in the outlet line 3, allows the fluid flow to the dosing line 1.

The reference sign 5 denotes the second valve, which branches off from the connection plug 2 and, from a certain pressure in the region of the dosing line 1, permits the fluid flow from the dosing line 1 to a bypass line, which leads for example into the tank or into the surroundings.

Figure 2:
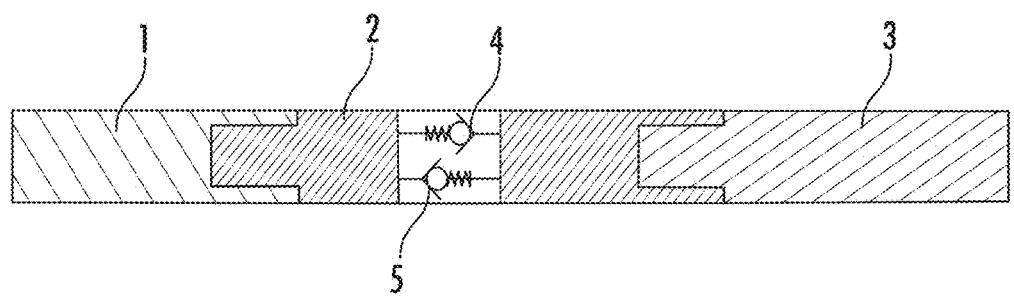
FIG. 2 shows a sectional view through a schematic illustration of the dosing line and the outlet line, wherein both valves are arranged in a common flow channel.

FIG. 2 shows a view similar to FIG. 1. Also, the same reference signs denote identical elements here. This also applies to the figures that follow. In FIG. 2, both valves 4, 5 are arranged within a common flow channel in the connection plug 2. The first valve 4 in this case again opens up the flow path from the outlet line 3 to the dosing line 1, and the second valve 5 opens up the flow path from the dosing line 1 to the outlet line 3, when the respective pressure conditions for opening the valves preloaded by a spring force are realized.

Figure 3:
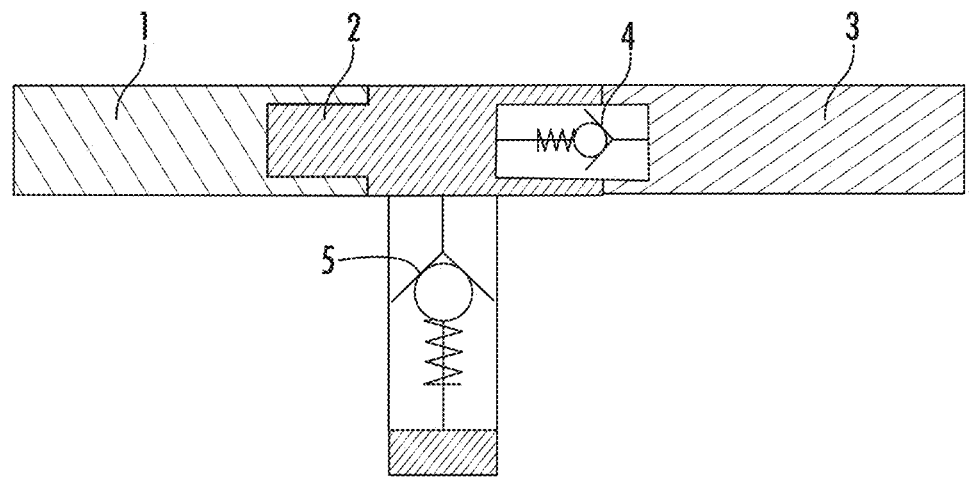
FIG. 3 shows a sectional view through a schematic illustration of the dosing line and the outlet line, with two valves being shown, wherein one valve influences the fluid flow into the dosing line and the other valve influences the backflow into a bypass, wherein one valve is arranged in the connection plug and the second valve is arranged in a separate connection region.

FIG. 3 shows a view similar to the view in FIG. 1. The first valve 4 is in this case arranged in the transition region between the connection plug 2 and the outlet line 3 and thus slightly closer to the pump, which follows the outlet line 3.

Figure 4:
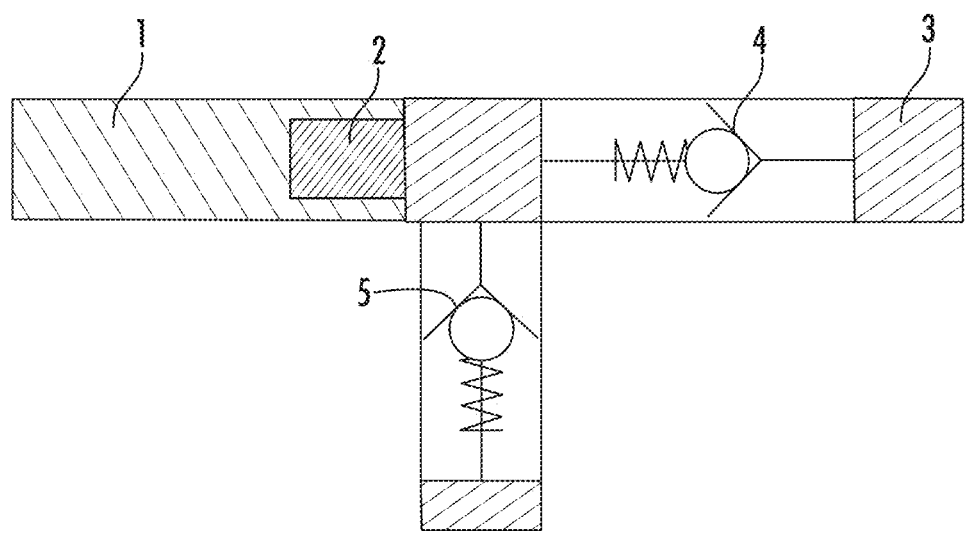
FIG. 4 shows a sectional view as in FIG. 3, wherein both valves are arranged in the region of the outlet line.

FIG. 4 shows an arrangement of the two valves 4, 5 in the region of the outlet line 3, wherein the first valve 4 is arranged in the flow section formed by the outlet line 3 and the second valve 5 branches off therefrom to a bypass line.

Figure 5:
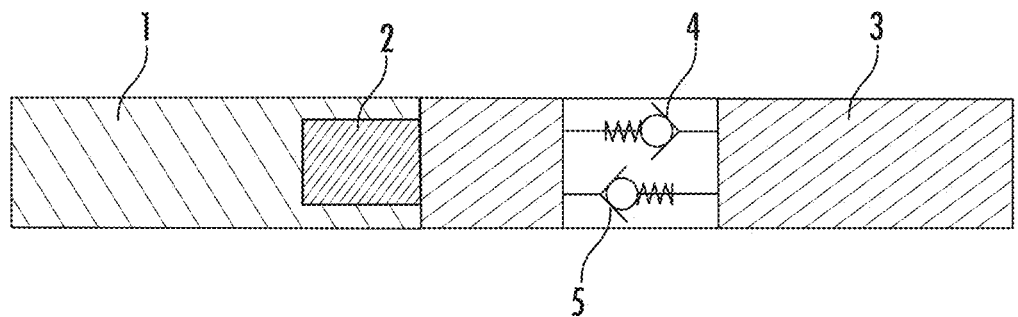
FIG. 5 shows a sectional view as in FIG. 2, wherein both valves are arranged in the region of the outlet line.

FIG. 5 shows an arrangement of the two valves 4, 5 completely in the outlet line 3, wherein the valves 4, 5 are arranged in the flow section formed by the outlet line 3 and subdivide the latter into two flow channels, which, according to the properties of the valves 4, 5, can be opened up in in each case one direction.

Figure 6:
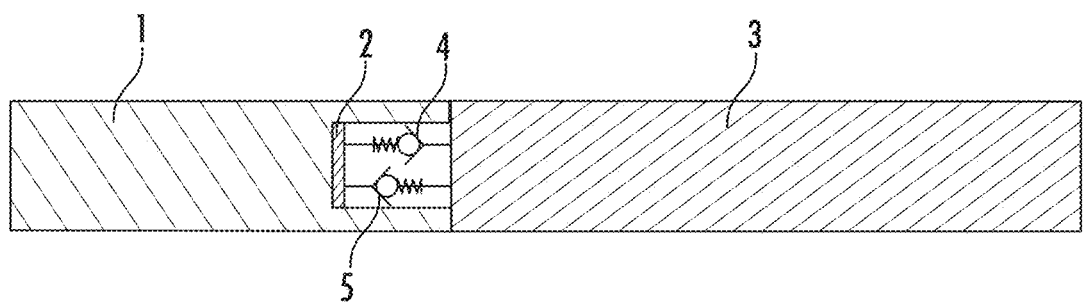
FIG. 6 shows a sectional view as in FIG. 2, wherein both valves are arranged in the region of the dosing line.

FIG. 6 shows an arrangement of the two valves 4, 5 as has already been shown in FIG. 5, wherein the valves 4, 5 are now arranged within the connection plug 2 and subdivide the flow section formed in the connection plug 2 into two flow channels.

Figure 7:
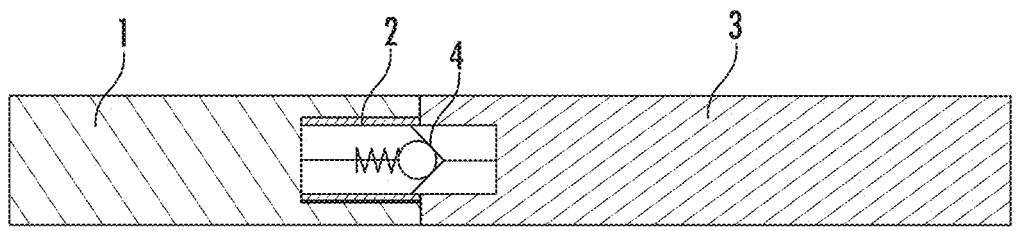
FIG. 7 shows a sectional view through a dosing line and an outlet line connected thereto, wherein the valve is arranged at the transition between the dosing line and the outlet line.

FIG. 7 shows an arrangement of the dosing line 1 and the outlet line 3 with only one valve 4. Said valve 4 is arranged within the connection plug 2 and can permit a fluid flow from the outlet line 3 to the dosing line 1 if a correspondingly high pressure prevails in the outlet line 3.

Figure 8:
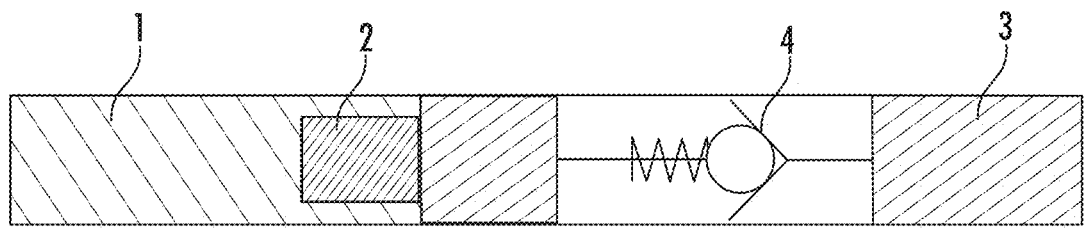
FIG. 8 shows a sectional view as in FIG. 7, wherein the valve is arranged in the region of the outlet line.

FIG. 8 shows an alternative configuration of the exemplary embodiment in FIG. 7, wherein the valve 4 is arranged within the outlet line 2 and thus closer to the pump.

The different features of the individual exemplary embodiments can also be combined with one another.

The exemplary embodiments in FIGS. 1 to 8 have in particular no limiting character and serve to illustrate the concept of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fluid-conveying device configured to convey a fluid from a tank along a dosing line to an injection point by a pump, wherein the dosing line is attached at a pressure side of the pump by a connection plug attached to an outlet line, comprising:
    at least one first valve preloaded by a spring and configured to:
        prevent a fluid flow from the dosing line to the outlet line and
        permit the fluid flow from the outlet line to the dosing line if a predefined minimum pressure $p_1$ is reached on that side of the at least one first valve that faces toward the outlet line opening; and
    a second valve configured to allow a fluid flow from the dosing line in a direction toward the outlet line only if a second pressure $p_2$ acts on the second valve from the side of the dosing line,
    wherein the predefined minimum pressure $p_1$, at which the at least one first valve opens, is lower than the second pressure $p_2$, at which the second valve opens.

2. The fluid-conveying device as claimed in claim 1, wherein the at least one first valve is arranged within the outlet line.

3. The fluid-conveying device as claimed in claim 1, wherein the outlet line has on its end region the connection plug configured to attach to the dosing line, wherein the at least one first valve is integrated in the connection plug.

4. The fluid-conveying device as claimed in claim 1, wherein the dosing line is in fluid communication with a discharge line by the second valve and/or is in fluid communication with the tank by way of a bypass.

5. The fluid-conveying device as claimed in claim 1, wherein the at least one first valve and the second valve are arranged in the connection plug.

6. The fluid-conveying device as claimed in claim 1, wherein the at least one first valve and the second valve are arranged parallel to one another in a common line, wherein the common line is subdivided by the at least one first valve and the second valve into two line sections with opposite flow directions.

7. The fluid-conveying device as claimed in claim 1, wherein a bypass branches off on a side of the at least one first valve that faces away from the outlet line, wherein the bypass leads into surroundings and/or back into the tank storing the fluid.

* * * * *